United States Patent
Kaihori et al.

(10) Patent No.: US 8,159,326 B2
(45) Date of Patent: Apr. 17, 2012

(54) LOCKING DEVICE

(75) Inventors: Hiroki Kaihori, Osaka (JP); Hiroyasu Okada, Hyogo (JP); Masaaki Ochi, Osaka (JP); Kenji Fujii, Fukui (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/446,785

(22) PCT Filed: Nov. 27, 2007

(86) PCT No.: PCT/JP2007/072831
§ 371 (c)(1),
(2), (4) Date: Apr. 23, 2009

(87) PCT Pub. No.: WO2008/066029
PCT Pub. Date: Jun. 5, 2008

(65) Prior Publication Data
US 2010/0033298 A1    Feb. 11, 2010

(30) Foreign Application Priority Data

Nov. 30, 2006    (JP) .................................. 2006-323392

(51) Int. Cl.
*G05B 23/00*    (2006.01)
(52) U.S. Cl. ...................................................... 340/5.72
(58) Field of Classification Search .................. 340/5.7, 340/5.6, 10.1; 307/10.1; 235/380, 376
See application file for complete search history.

(56) References Cited

U.S. PATENT DOCUMENTS

| 7,336,151 B2 * | 2/2008 | Ueda et al. .................... 340/5.72 |
| 2006/0012462 A1 | 1/2006 | Teshima et al. | |

FOREIGN PATENT DOCUMENTS

| JP | 2002-201838 | 7/2002 |
| JP | 2003-020837 | 1/2003 |
| JP | 2003-106019 | 4/2003 |
| JP | 2004-156238 | 6/2004 |
| JP | 2006-028838 | 2/2006 |

OTHER PUBLICATIONS

International Search Report issued Jan. 8, 2008 in the International (PCT) Applicaiton of which the present application is the U.S. National Stage.

* cited by examiner

*Primary Examiner* — Vernal Brown
(74) *Attorney, Agent, or Firm* — Wenderoth, Lind & Ponack, L.L.P.

(57) ABSTRACT

A present locking device is a locking device for locking/unlocking a lock of a door of a closed space, including: a first transmission antenna for transmitting a first signal to a range including an outside of the closed space; a second transmission antenna for transmitting a second signal to an inside of the closed space as a target; a key which transmits a first response signal when receiving the first signal and not receiving the second signal, and which transmits a second response signal when receiving the first signal and also receiving the second signal; a reception antenna for receiving at least the first response signal from the key; and a control unit for controlling whether locking or unlocking can be performed on the lock or not, based at least on whether the reception antenna receives the first response signal or not.

5 Claims, 10 Drawing Sheets

LOCKING DEVICE

TECHNICAL FIELD

The present invention relates to a locking device for controlling locking and unlocking of a car, a house, and the like by using a radio signal or the like.

BACKGROUND ART

In recent years, a locking device for locking/unlocking a door of a car, a house, or the like by remote control is being practically used. A technique related to such a locking device is disclosed in, for example, Patent Document 1.

FIG. 9 is a configuration diagram showing an example of a conventional locking device used for a car. FIG. 10 is a diagram showing a control procedure performed in a case where a key exists on an outside of a car in a conventional locking device. Hereinafter, a car as shown in FIG. 9 will be taken as an example, and a conventional locking device of this type will be described.

First, a user of car 2 having key 6B touches a touch button 1 shown in FIG. 9 from an outside of car 2. As shown in FIG. 10, all-key ringing signal 5 is generated from car interior transmission antennas 4A and 4B having communication range 2A in car 2. However, since key 6B does not exist in communication range 2A, key 6B does not respond to the signal. Information thereof, that is, information that key 6B does not exist in the car is stored in a storage (not shown) in car 2.

Next, all-key ringing signal 12 is generated from car exterior transmission antenna 5C having communication range 2B including the outside of car 2. Since key 6B exists in communication range 2B, key 6B receives all-key ringing signal 12. Key 6B transmits response signal 13B to all-key ringing signal 12 to reception antenna 8 of car 2. In the storage in car 2, the information that key 6B exists on the outside of the car is stored. Consequently, individual authentication ringing signal 14 is transmitted from car exterior transmission antenna 5C to key 6B. In a case where key 6B receives this individual authentication ringing signal 14 and collation with a security code stored in key 6B is obtained, key 6B transmits individual authentication response signal 15. By the information, it is recognized that key 6B exists on the outside of car 2.

Accordingly, an unlock instruction or a lock instruction is given to the lock of the door in car 2. That is, the user having key 6B can control a state of the lock.

On the other hand, if a third party touches touch button 1 shown in FIG. 9 when the user of car 2 having key 6A stays in car 2, all-key ringing signal 5 is generated from car interior transmission antennas 4A and 4B having communication range 2A in car 2. Key 6A existing in communication range 2A receives all-key ringing signal 5 and transmits response signal 7 to reception antenna 8. When reception antenna 8 receives response signal 7, individual authentication ringing signal 9 is transmitted from car interior transmission antennas 4A and 4B to key 6A. In a case where key 6A receives individual authentication ringing signal 9 and collation with a security code stored in key 6A is obtained, key 6A transmits individual authentication response signal 10. Consequently, information that key 6A exists in the car is stored in the storage in car 2.

Next, car exterior transmission antenna 5C having a range including the outside of car 2 as communication range 2B thereof generates all-key ringing signal 12. Key 6A existing in communication range 2B receives this all-key ringing signal 12 and transmits response signal 13A to all-key ringing signal 12 to reception antenna 8 of car 2. However, since the information that key 6A exists in the car is stored in the storage in car 2, individual authentication ringing signal 14 is not transmitted from car exterior transmission antenna 5C to key 6A. Therefore, the lock of the door is uncontrollable and the third party cannot open the door of car 2.

FIG. 9 shows a configuration example in which car exterior transmission antennas 5A and 5B having a function similar to that of car exterior transmission antenna 5C are further mounted.

As described above, the conventional locking device had a configuration such that by transmitting all-key ringing signal 5 to an inside of car 2 before transmitting all-key ringing signal 12, nonexistence of keys 6A, 6B, 6C, and 6D in car 2 is confirmed and whether the locking control is enabled or not is determined. With such a configuration, the conventional locking device takes a measure for security to prevent a third party from opening the door in a case where the user having key 6A stays in car 2.

In the above-described conventional configuration, to specify an area where keys 6A, 6B, 6C, and 6D exist, as shown in FIG. 10, whether there is a response by a response signal from keys 6A, 6B, 6C, and 6D or not is determined. Consequently, reception has to be attempted twice. Specifically, reception of both response signal 7 to all-key ringing signal 5 from car interior transmission antennas 4A and 4B and response signals 13A and 13B to all-key ringing signal 12 from car exterior transmission antenna 5C is attempted, and each of the areas where keys 6A, 6B, 6C, and 6D exist has to be specified. As a result, communication time is long. As described above, the conventional locking device has problems that long communication time is necessary.

Patent Document 1: Unexamined Japanese Patent Publication No. 2003-20837

DISCLOSURE OF THE INVENTION

To solve the above problems, a locking device of the present invention is a locking device for locking/unlocking a lock of a door of a closed space, including: a first transmission antenna for transmitting a first signal to a range including outside of the closed space; a second transmission antenna for transmitting a second signal to an inside of the closed space as a target; a key which transmits a first response signal when receiving the first signal and not receiving the second signal, and transmits a second response signal when receiving the first signal and also receiving the second signal; a reception antenna for receiving at least the first response signal from the key; and a control unit for controlling whether locking or unlocking can be performed on the lock or not, based at least on whether the reception antenna receives the first response signal or not.

With such a configuration, only in a case where the first response signal from the key is received by the reception antenna, the locking device of the present invention can control the lock. Consequently, it is unnecessary to receive response signals from the keys twice. By receiving the first response signal or the second response signal from each key only once, or by receiving neither the first nor second response signals, an area where each key exists can be specified. Thus, communication time can be shortened.

Figure 1:
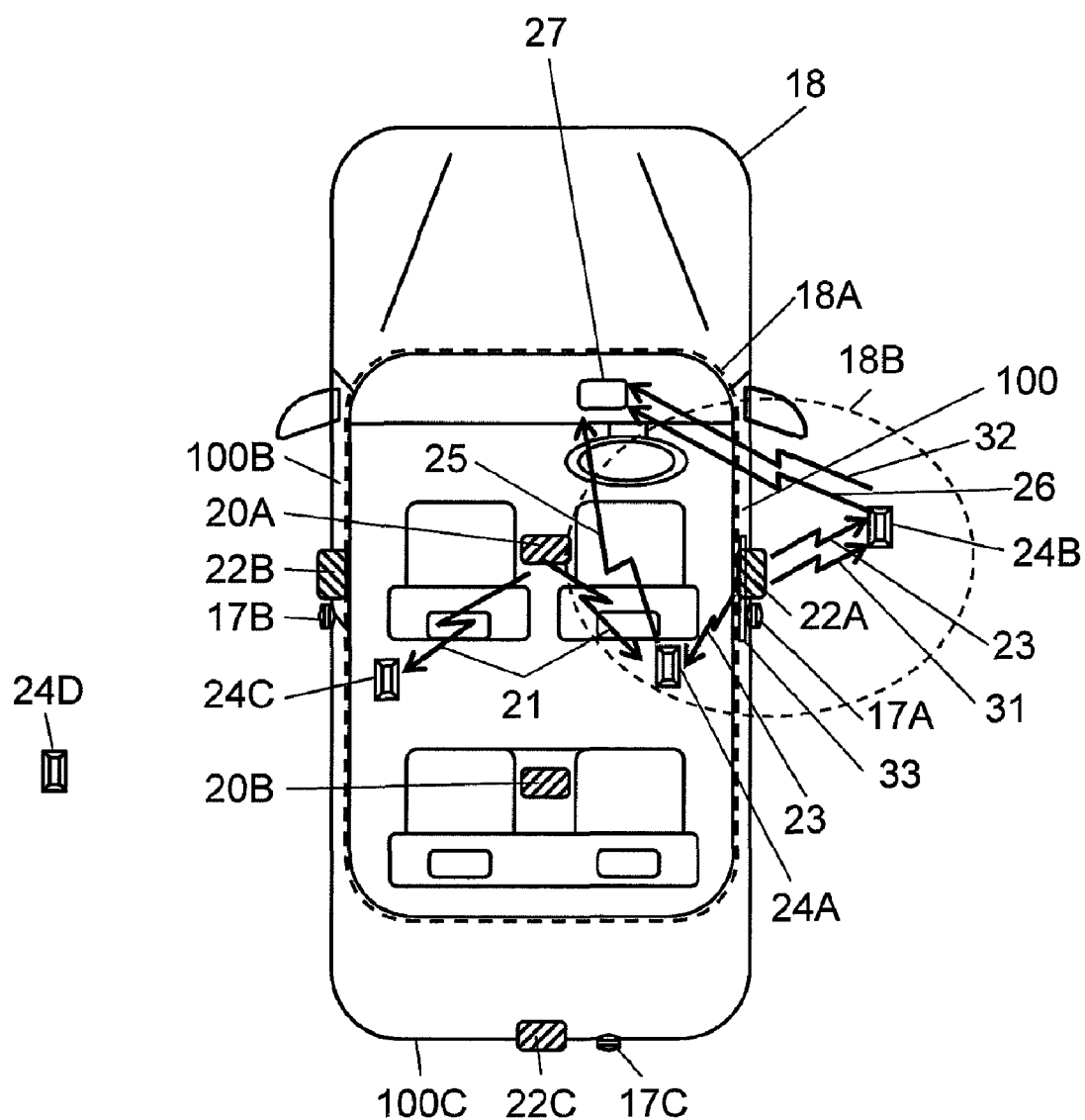
FIG. 1 is a configuration diagram of a locking device according to a first embodiment of the present invention.

REFERENCE MARKS IN THE DRAWINGS 1, 17A, 17B, 17C Touch button
2, 18 Car
2A, 18A Closed space
2B, 18B Communication range
4A, 4B, 20A, 20B Car interior transmission antenna (second transmission antenna)
5A, 5B, 5C, 22A, 22B, 22C Car exterior transmission antenna (first transmission antenna)
6A, 6B, 6C, 6D, 24A, 24B, 24C, 24D, 1024B Key
8, 27 Reception antenna
19 Control unit
21 Extended ringing signal (second signal)
21B Re-extended ringing signal (third signal)
23 All-key ringing signal (first signal)
25 Second response signal
26 First response signal
28A, 28B Key reception antenna
29A, 29B Key control unit
30A, 30B Key transmission antenna
31 Individual authentication ringing signal
32 Individual authentication response signal
33 Lock
100, 100B Door

PREFERRED EMBODIMENTS FOR CARRYING OUT OF THE INVENTION

First Embodiment

A locking device according to a first embodiment of the present invention will be described below with reference to the drawings.

Figure 2:
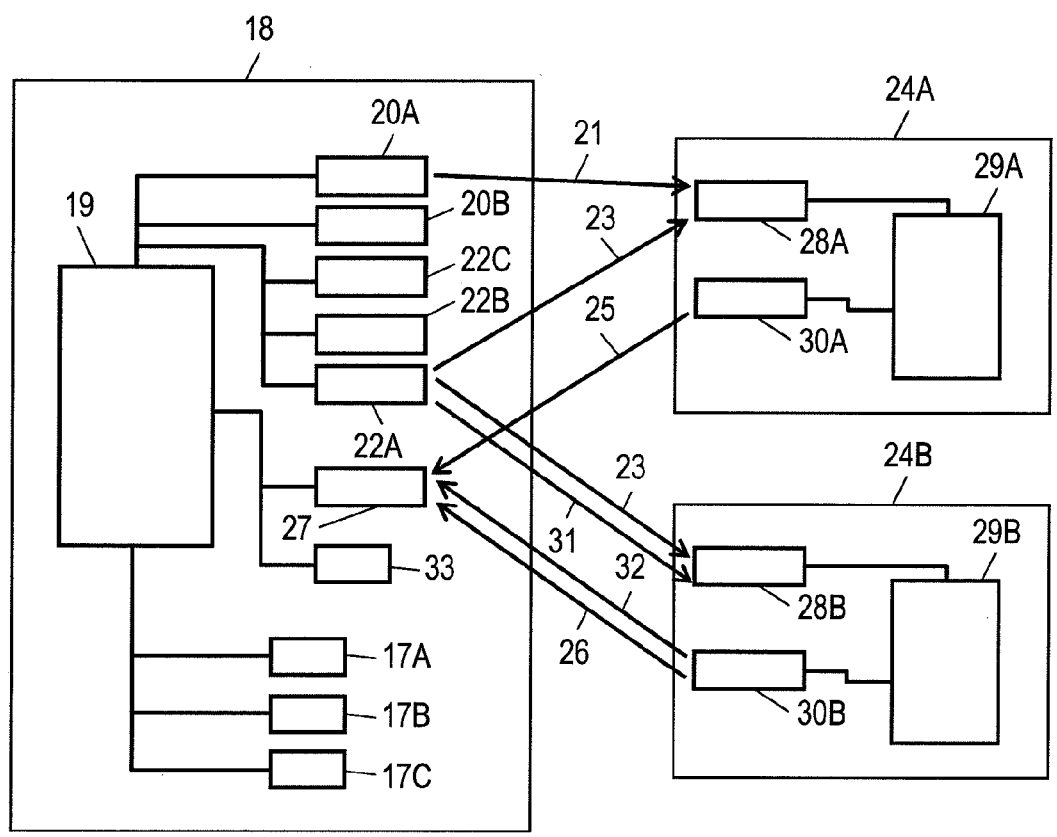
FIG. 2 is a block diagram of the locking device according to the first embodiment of the present invention.

FIG. 1 is a configuration diagram of a locking device according to the first embodiment of the present invention. FIG. 2 is a block diagram of the locking device. In the present embodiment, an example of applying the locking device of the present invention to a car will be described.

As shown in FIG. 1, car 18 to which the locking device is applied has doors 100 and 100B for boarding/exiting, and trunk 100C for loading. In car 18, closed space 18A partitioned from an outside of the car is formed. Further, door 100 is provided with lock 33 for locking/unlocking door 100. Similarly, a lock (not shown) is provided for each of door 100B and trunk 100C. When lock 33 is in an unlocked state, door 100 can be opened. On the other hand, when lock 33 is in a locked state, door 100 cannot be opened at least from the outside.

The locking device of the present invention is a locking device for locking/unlocking a lock of a door of a closed space like car 18, and performs locking/unlocking control for switching between an unlocked state and a locked state, and a control related to locking/unlocking such as switching of whether the locking/unlocking control is enabled or not.

In the present embodiment, an example will be described in which a user can carry keys 24A, 24B, 24C, and 24D, and the user can control, for example, lock 33 of door 100 by carrying these keys.

To realize such locking/unlocking function, the locking device of the present embodiment has, as shown in FIG. 1 and FIG. 2, car exterior transmission antenna 22A as a first transmission antenna, car interior transmission antennas 20A and 20B as second transmission antennas, keys 24A, 24B, 24C, and 24D for remote-controlling lock 33 by transmitting/receiving signals, reception antenna 27 for receiving signals from keys 24A, 24B, 24C, and 24D, and control unit 19 for performing control related to locking/unlocking such as locking/unlocking control. In the present embodiment, an example is described that touch buttons 17A, 17B, and 17C are provided on an outside of car 18 since the user of car 18 makes the functions of the locking device operate.

Car exterior transmission antenna 22A is mounted, for example, on an outside of door 100 or on the outside of car 18 near door 100, and transmits all-key ringing signal 23 as the first signal or the like to a range including outside of closed space 18A. That is, car exterior transmission antenna 22A transmits those signals from door 100 to communication range 18B including a part of closed space 18A and a part of an outside of closed space 18A.

FIG. 1 and FIG. 2 show an example in which car exterior transmission antenna 22B directed to the lock to door 100B and car exterior transmission antenna 22C directed to the lock to trunk 100 are also provided. In the present embodiment, locking/unlocking of lock 33 to door 100 among the doors, the trunk and the like will be mainly described.

Car interior transmission antennas 20A and 20B are mounted in closed space 18A as a car compartment and transmit extended ringing signal 21 as a second signal to an inside of closed space 18A. Specifically, the communication range of car interior transmission antennas 20A and 20B is closed space 18A, and extended ringing signal 21 is substantially transmitted only in closed space 18A. The extended ringing signal 21 is used to determine whether or not there is a key in closed space 18A, that is in the car. In the present embodiment, an example of mounting two antennas, which are car interior transmission antennas 20A and 20B, is described. For example, one antenna is sufficient if the antenna can transmit signal sufficiently in closed space 18A. On the contrary, two or more antennas may be mounted.

Keys 24A, 24B, 24C, and 24D receive, according to existing positions thereof, all-key ringing signal 23 transmitted from car exterior transmission antenna 22A and extended ringing signal 21 transmitted from car interior transmission antennas 20A and 20B. Further, keys 24A, 24B, 24C, and 24D transmit response signals based on types of ringing signals and whether signals can be received or not. Since keys 24A, 24B, 24C, and 24D perform such a process, as shown in FIG. 2, key 24A includes key reception antenna 28A for receiving signals from the transmission antennas, key control unit 29A for executing various processes and controls in key 24A, and key transmission antenna 30A for transmitting a response signal generated by key control unit 29A. Similarly, key 24B includes key reception antenna 28B, key control unit 29B, and key transmission antenna 30B. Keys 24C and 24D are also similar to the above.

FIG. 1 shows a case where key 24A is positioned in closed space 18A and communication range 18B, key 24B is positioned on the outside of closed space 18A and in communication range 18B, key 24C is positioned in closed space 18A and on an outside of communication range 18B, and key 24D is positioned on the outside of closed space 18A and on the outside of communication range 18B. That is, keys 24A and 24C can receive a signal from car interior transmission antenna 20A or 20B. Keys 24A and 24B can receive a signal from car exterior transmission antenna 22A. Key 24D cannot receive any of signals from car interior transmission antennas 20A and 20B and car exterior transmission antenna 22A. In the present embodiment, for easier explanation, an example that the four keys are in such positions will be described. The number of keys may be one or more. In addition, the key is usually held by the user of car 18, and even in a case of using a single key, the key can be positioned in various places such as the positions of keys 24A, 24B, 24C, and 24D shown in FIG. 1.

Further, in a case where all-key ringing signal 23 is received and extended ringing signal 21 is not received, keys 24A, 24B, 24C, and 24D transmit first response signal 26. In a case where all-key ringing signal 23 is received and extended ringing signal 21 is received, keys 24A, 24B, 24C, and 24D transmit second response signal 25. Specifically, for example, in a case of key 24A, key control unit 29A determines whether all-key ringing signal 23 and extended ringing signal 21 are received by key reception antenna 28A or not. Further, according to the determination result, key control unit 29A controls so as to transmit first response signal 26 and second response signal 25 from key transmission antenna 30A. In a case where all-key ringing cannot be received, keys 24A, 24B, 24C, and 24D do not transmit a response signal. Naturally, also in a case where all of ringing signals cannot be received, keys 24A, 24B, 24C, and 24D do not transmit response signals.

Reception antenna 27 receives, as described above, response signals such as first response signal 26 and second response signal 25 transmitted from the keys. The signals such as response signals received by reception antenna 27 are transmitted to control unit 19.

Control unit 19 performs control related to locking/unlocking such as locking/unlocking control on lock 33. To perform such controls, as shown in FIG. 2, in car 18, control unit 19 is connected to touch buttons 17A, 17B, and 17C, car interior transmission antennas 20A and 20B, car exterior transmission antennas 22A, 22B, and 22C, reception antenna 27, and lock 33.

In such a configuration, control unit 19 controls car interior transmission antennas 20A and 20B to transmit extended ringing signal 21, and controls car exterior transmission antennas 22A, 22B, and 22C to transmit all-key ringing signal 23. Control unit 19 determines whether reception antenna 27 received at least first response signal 26 from any of keys 24A, 24B, 24C, and 24D or not. Further, based on the determination of whether first response signal 26 was received or not, control unit 19 controls whether locking/unlocking on the lock is possible or not, that is, whether locking/unlocking is permitted or not. Further, when locking/unlocking is permitted, control unit 19 performs locking/unlocking control to open (unlock) or close (lock) a lock.

The locking device of the present embodiment has a basic configuration as described above. For example, since key 24B receives all-key ringing signal 23 and does not receive extended ringing signal 21, key 24B transmits first response signal 26. Consequently, reception antenna 27 receives first response signal 26 from key 24B. As a result, control unit 19 determines that the first response signal from key 24B is received, and controls to permit locking/unlocking of lock 33 near key 24B. Consequently, only by the remote control on the key performed by the user positioned near the outside of door 100, door 100 can be locked/unlocked. With such a configuration, it is sufficient to attempt to receive response signals from keys 24A, 24B, 24C, and 24D only once, so that communication time can be suppressed.

In the present embodiment, a configuration example of performing individual authentication on a key in order to increase reliability in locking/unlocking will be described.

To perform such an individual authentication process, when reception antenna 27 receives a first response signal from a key, control unit 19 controls car exterior transmission antennas 22A, 22B, and 22C to transmit an individual authentication ringing signal. The individual authentication ringing signal is a signal for individual authentication for determining whether the responded key is a key registered in car 18 or not. Moreover, only in a case where the key further transmits an individual authentication response signal to the individual authentication ringing signal to reception antenna 27, control unit 19 controls the lock so that locking/unlocking of the lock is permitted.

For example, as shown in FIG. 1 and FIG. 2, when reception antenna 27 receives first response signal 26 from key 24B, control unit 19 controls car exterior transmission antenna 22A to transmit individual authentication ringing signal 31. Consequently, key 24B receives individual authentication ringing signal 31. In key 24B, key control unit 29B collates, for example, received individual authentication ringing signal 31 with data for individual authentication stored in key 24B. When they match, key 24B transmits individual authentication response signal 32. When they do not match, key 24B does not transmit individual authentication response signal 32. In such a manner, only in a case where reception antenna 27 receives individual authentication response signal 32, control unit 19 controls lock 33 so that locking/unlocking on lock 33 is enabled.

Figure 3:
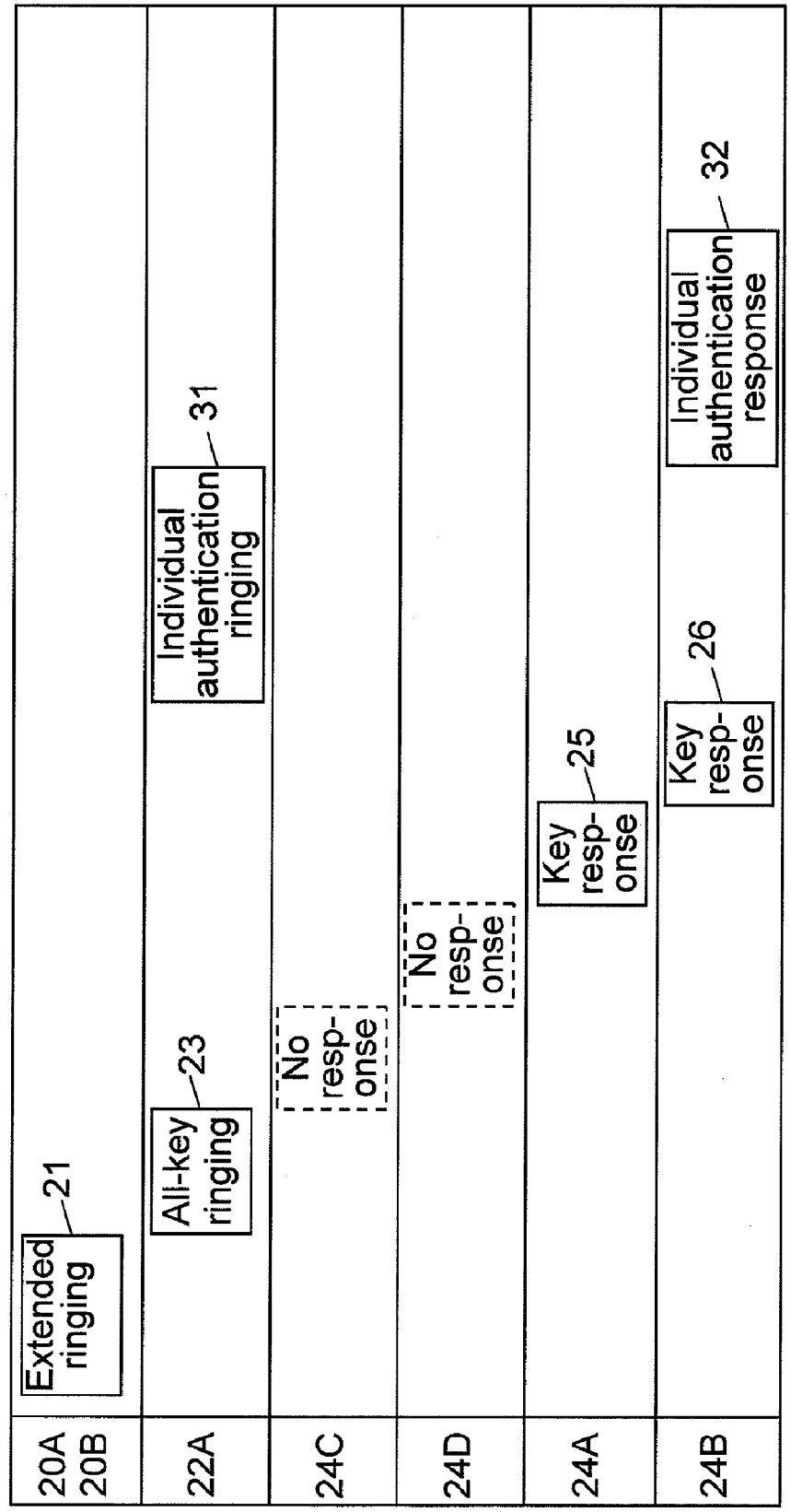
FIG. 3 is a timing chart showing a control procedure of the locking device according to the first embodiment of the present invention.

FIG. 3 is a timing chart showing a control procedure of the locking device in the present embodiment configured as described above. As shown in FIG. 3, under control of control unit 19, first, extended ringing signal 21 is transmitted from car interior transmission antennas 20A and 20B and, subsequently, all-key ringing signal 23 is transmitted from car exterior transmission antenna 22A. Thereafter, reception antenna 27 tries to receive response signals from keys 24A, 24B, 24C, and 24D in predetermined time intervals. Since key 24A shown in FIG. 1 has received extended ringing signal 21 and all-key ringing signal 23, it transmits second response signal 25. In addition, since key 24B shown in FIG. 1 has not received extended ringing signal 21 but received all-key ringing signal 23, it transmits first response signal 26. Further, under control of control unit 19, individual authentication ringing signal 31 is transmitted from car exterior transmission antenna 22A to key 24B which has transmitted first response signal 26. When data matches in collation for individual authentication, key 24B transmits individual authentication response signal 32.

Next, an operation of the locking device of the present embodiment configured as described above will be described. How keys 24A, 24B, 24C, and 24D disposed in various areas and car 18 as shown in FIG. 1 transmit/receive signals to/from each other will be concurrently described below.

First, the user of car 18 touches touch button 17A shown in FIG. 1. This information is transmitted to control unit 19, and control unit 19 operates. Next, an instruction to generate extended ringing signal 21 is given from the control unit 19 to car interior transmission antennas 20A and 20B. Only keys 24A and 24C existing in closed space 18A receive the extended ringing signal 21. On the other hand, keys 24B and 24D which do not exist in closed space 18A do not receive the extended ringing signal 21. In the present embodiment, at this stage, a configuration is such that a key does not transmit a response signal to extended ringing signal 21.

Next, control unit 19 gives an instruction to generate all-key ringing signal 23 to car exterior transmission antenna 22A. As shown in FIG. 1, keys 24A and 24B existing in communication range 18B receive the all-key ringing signal 23 by key reception antennas 28A and 28B, respectively. Second response signal 25 is generated in key control unit 29A, and first response signal 26 is generated in key control unit 29B. Key 24A transmits the second response signal 25 from key transmission antenna 30A. Key 24B transmits first response signal 26 from key transmission antenna 30B. These response signals are received by reception antenna 27.

Here, second response signal 25 includes information that key 24A has received extended ringing signal 21, that is, information that key 24A exists in car 18. On the other hand, first response signal 26 includes information that key 24B has not received extended ringing signal 21, that is, information that key 24B does not exist in car 18.

Response timings of keys 24A, 24B, 24C, and 24D are shifted as shown in FIG. 3 so that control unit 19 can determine which of keys 24A, 24B, 24C, and 24D have transmitted response signals 25 and 26.

Since keys 24C and 24D do not exist in communication range 18B of car exterior transmission antenna 22A, keys 24C and 24D do not receive all-key ringing signal 23, and do not transmit second response signal 25 and first response signal 26 to reception antenna 27.

Thereafter, control unit 19 recognizes from the second response signal 25 and the first response signal 26 that a key which exists in communication range 18B and does not exist in closed space 18A, that is, a key existing on the outside of car 18 and close to car 18 is only key 24B out of responded keys 24A and 24B. Therefore, individual authentication ringing signal 31 is transmitted from car exterior transmission antenna 22A only to the key 24B.

As described above, the individual authentication ringing signal 31 is a signal for determining whether responded key 24B is a key registered in car 18 or not. In other words, individual authentication ringing signal 31 is transmitted to determine that the key 24B is registered in car 18 or registered in another car in a case such that a key of a same type which is registered in a car other than car 18 exists in communication range 18B and transmits a response signal at a same timing.

In a case where key 24B which has received the individual authentication ringing signal 31 is registered in car 18, the individual authentication response signal 32 is transmitted to reception antenna 27 of car 18. Further, when control unit 19 receives individual authentication response signal 32 by reception antenna 27, the control unit 19 controls lock 33 to permit locking/unlocking operation, and executes locking control or unlocking control. That is, in a case of performing the locking control, door 100 is locked by lock 33 and cannot be opened at least from the outside. In a case of performing the unlocking control, door 100 locked by lock 33 is unlocked, and can be freely opened.

With such a configuration, by receiving second response signal 25 or first response signal 26 from keys 24A, 24B, 24C, and 24D only once, or receiving neither first response signal 26 nor second response signal 25, the area where any of keys 24A, 24B, 24C, and 24D exists can be specified. Consequently, reception of the response signal twice is unnecessary and communication time can be shortened.

In the present embodiment, a configuration of mounting car exterior transmission antenna 22A and touch button 17A on door 100 near a driver's seat has been mainly described. Alternatively, as described above, a configuration of mounting car exterior transmission antenna 22B and touch button 17B on door 100B near a front passenger seat, or a configuration of mounting car exterior transmission antenna 22C and touch button 17C on trunk 100C may be employed. However, the configuration of mounting on door 100 near the driver's seat is desirable from a viewpoint of convenience for a reason that the driver can perform locking/unlocking when the driver gets on/off the car.

Further, it is more desirable from the viewpoint of convenience to mount car exterior transmission antennas 22A, 22B, and 22C and touch buttons 17A, 17B, and 17C on door 100 near the driver's seat, door 100B near the front passenger's seat, and trunk 100C.

Another configuration may be employed such that when control unit 19 which receives individual authentication response signal 32 by reception antenna 27 has locked (or has unlocked) lock 33, control unit 19 stores the information. Specifically, when control unit 19 stores locking/unlocking control information as information related to locking/unlocking control performed on lock 33, and the locking/unlocking control information indicates unlocking control in the locking/unlocking control performed next, locking control may be performed on lock 33. When the locking/unlocking control information indicates locking control, the control of unlocking lock 33 may be performed. Such a configuration is desirable since control unit 19 can recognize that the next control on lock 33 is unlocking (or locking) control, it is unnecessary to provide two types of touch buttons 17A for locking and unlocking but one touch button 17A is sufficient as shown in FIG. 1.

Further, in a case where a manual locking/unlocking switch (not shown) for forcedly performing locking/unlocking control manually from the inside of car 18 as the closed space is provided in car 18, desirably, control unit 19 recognizes a state of the manual locking/unlocking switch, and based on the state of the manual locking/unlocking switch, determines the next control on lock 33 is unlocking control or locking control. Specifically, for example, even in a case where the control on lock 33 of last time is the locking control, if the user unlocks by the manual locking/unlocking switch, the locking device is in an unlocked state. In such a case, desirably, the next control is not performed based on information of "locked" as the control of last time, but by executing "locking control" as the next control based on the state of the manual locking/unlocking switch, that is, the information of "unlocked state", correct control can be performed on lock 33. That is, in a configuration such that the manual locking/unlocking switch is provided in car 18, more preferably, in a case where the state of the manual locking/unlocking switch is the unlocked state, control unit 19 performs the locking control on lock 33. In a case where the state of the manual locking/unlocking switch is the locked state, the unlocking control is performed on lock 33.

Although car 18 has been described as an example in the present embodiment, the present invention can be carried out in various locking devices such as a house.

Second Embodiment

A locking device according to a second embodiment of the present invention will be described below with reference to the drawings. The same reference numerals are designated to components having configurations similar to those of the first embodiment and descriptions thereof will not be repeated.

Figure 4:
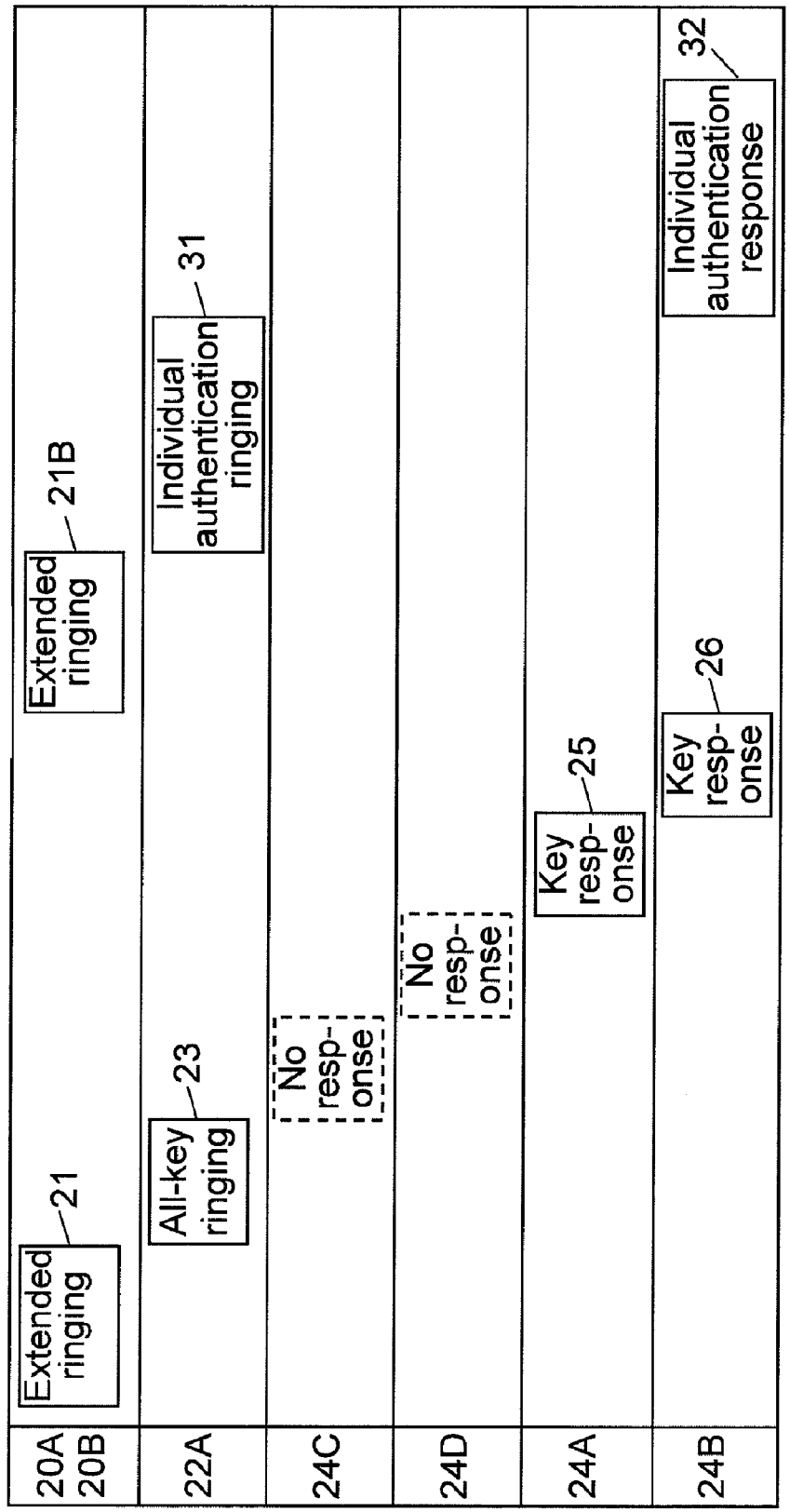
FIG. 4 is a timing chart showing a control procedure of a locking device according to a second embodiment of the present invention.

FIG. 4 is a timing chart showing a control procedure of a locking device according to the second embodiment.

The present embodiment is different from the first embodiment with respect to a point that, as shown in FIG. 4, after control unit 19 receives second response signal 25, control unit 19 transmits again extended ringing signal 21B as a third signal from car interior transmission antennas 20A and 20B, and thereafter, transmits individual authentication ringing signal 31. That is, in the present embodiment, before control unit 19 controls to transmit individual authentication ringing signal 31, control unit 19 controls car interior transmission antennas 20A and 20B to transmit the third signal. In a case where the key does not receive the third signal, control unit 19 transmits first individual authentication response signal 32 to reception antenna 27. In a case where the third signal is received, control unit 19 transmits second individual authentication response signal 33.

With this configuration, reliability on specification of areas where keys 24A, 24B, 24C, and 24D exist and the locking/unlocking control on the lock can be improved. Specifically, as shown in FIG. 1, in a case such that although key 24A exists in closed space 18A, extended ringing signal 21 of the first time cannot be received due to noise or the like, control unit 19 erroneously determines that key 24A exists on the outside of car 18.

FIG. 4 shows a case where key 24A correctly transmits second response signal. However, in a case where key 24A cannot receive extended ringing signal 21 as described above, key 24A transmits first response signal 26. As a result, control unit 19 erroneously determines that key 24A exists on the outside of car 18.

When the unlocking/locking control on a lock is permitted due to such erroneous determination, the measure for security to prevent a third party from opening the door in a case where the user stays in car 18 does not work. To prevent such a situation, in the present embodiment, car interior transmission antennas 20A and 20B transmit again an extended ringing signal (hereinafter, called re-extended ringing signal) 21B and, subsequently, transmit individual authentication ringing signal 31. In a case where the key which receives individual authentication ringing signal 31 has not received re-extended ringing signal 21B, individual authentication response signal 32 is transmitted.

Therefore, control unit 19 receiving individual authentication response signal 32 can recognize again that the key exists on the outside of car 18. With such a configuration, reliability of specification of areas in which keys 24A, 24B, 24C, and 24D exist and the locking/unlocking control on the lock can be increased.

Further, transmission of re-extended ringing signal 21B has the following advantages.

Figure 5:
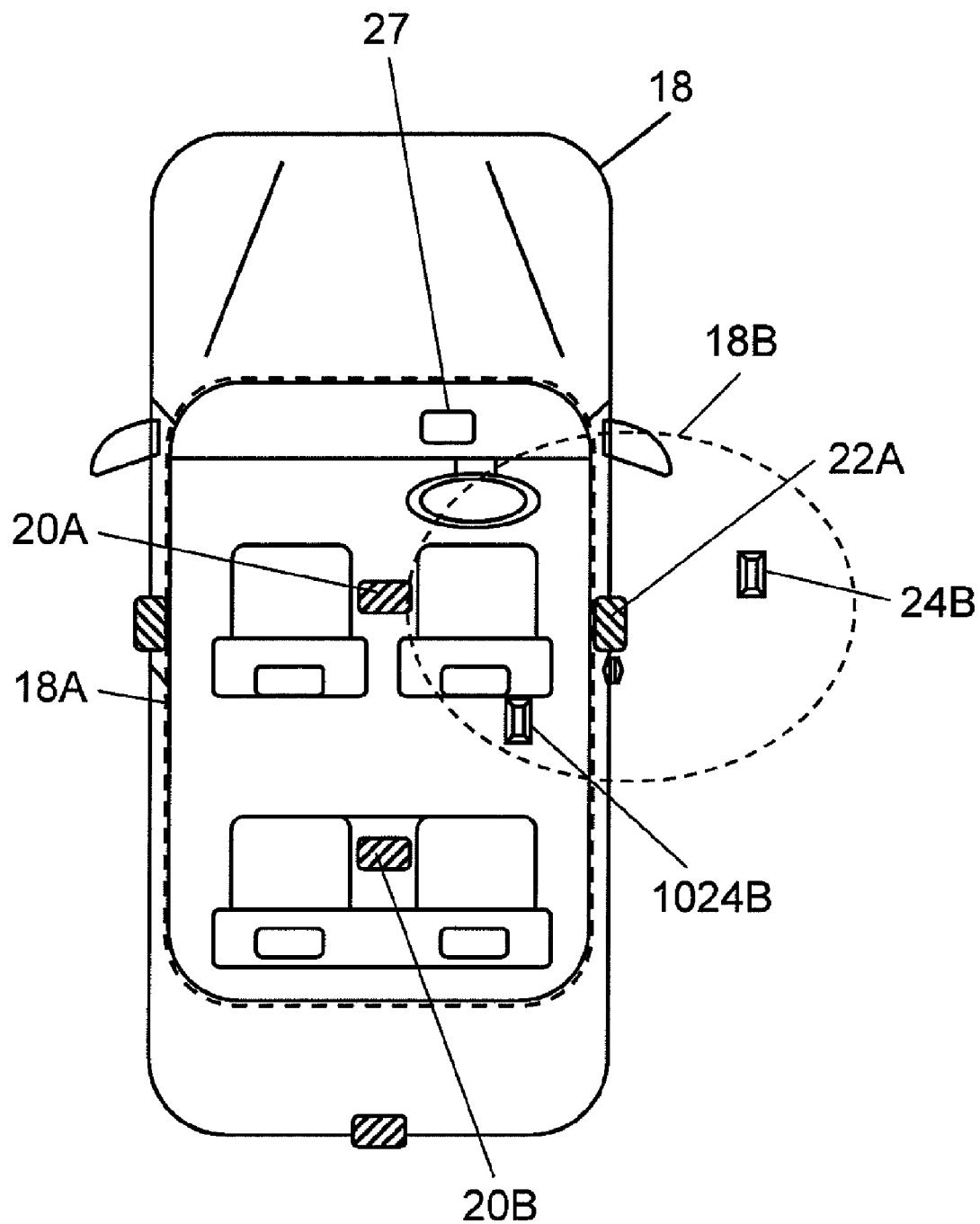
FIG. 5 is a configuration diagram showing another embodiment of the locking device according to the second embodiment of the present invention.
Figure 6:
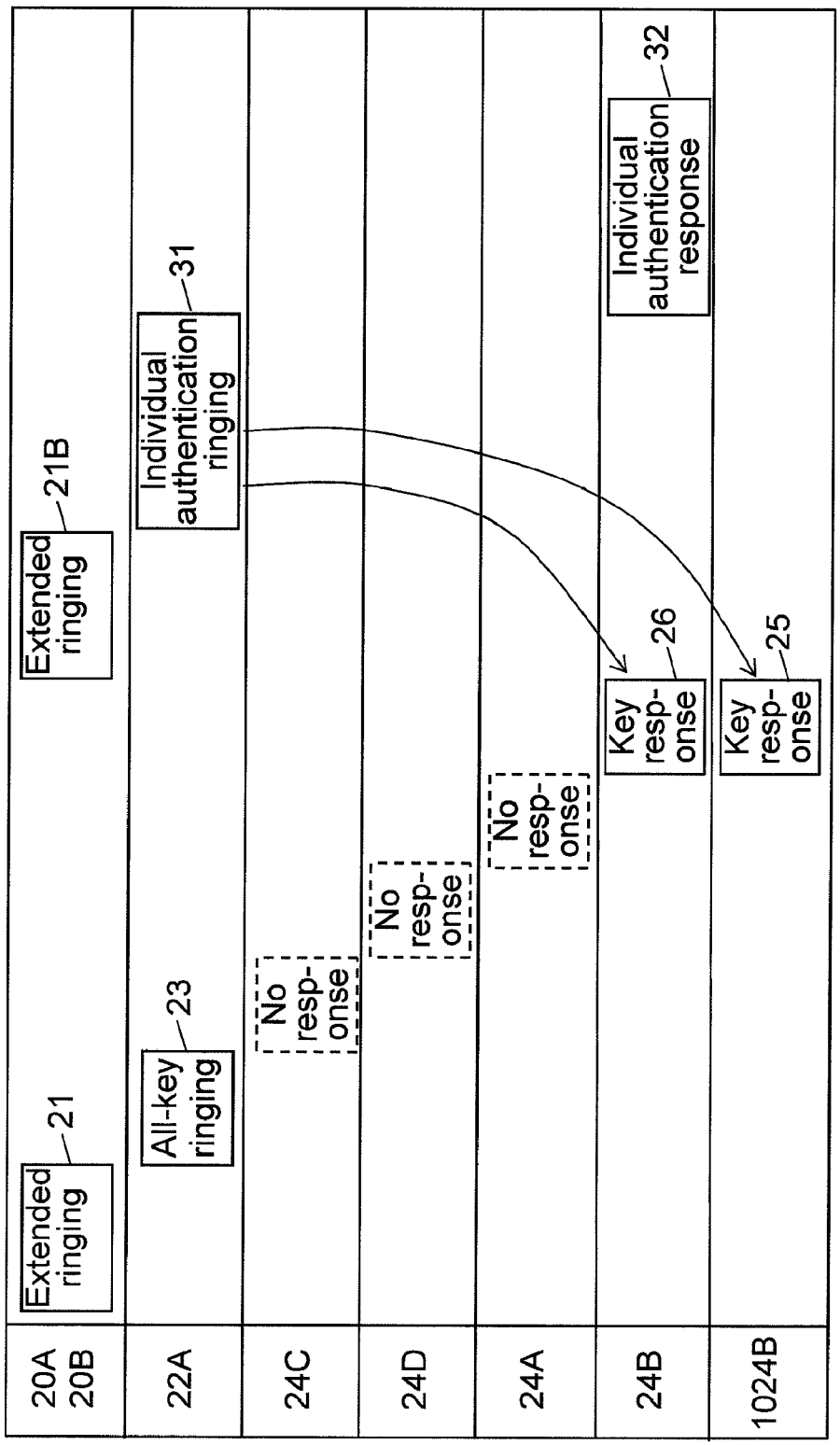
FIG. 6 is a timing chart showing a control procedure in another embodiment of the locking device according to the second embodiment of the present invention.

FIG. 5 is a configuration diagram showing another embodiment of the locking device in the present embodiment. FIG. 6 is a timing chart showing a control procedure thereof. FIG. 5 shows an example where key 1024B registered in another car exists in car 18. Key 1024B corresponds to key 24B for car 18.

As shown in FIG. 5, in a case where key 24B is on the outside of closed space 18A and exists in communication range 18B, and key 1024B exists in closed space 18A and in communication range 18B, there is a possibility that key 1024B of another car receives re-extended ringing signal 21B and individual authentication ringing signal 31. In such a case, there is a possibility that reception antenna 27 receives first response signal 26 from key 24B of its car and also receives second response signal 25 from key 1024B of another car.

If reception antenna 27 preferentially receives first response signal 26 from key 24B, there is no problem. On the other hand, in a case where reception antenna 27 preferentially receives second response signal 25 from key 1024B of another car, a situation occurs such that the user of car 18 locks himself/herself out of car 18. Specifically, although key 24B actually exists in communication range 18B and exists on the outside of closed space 18A, control unit 19 may erroneously determine that the key exists in closed space 18A. When control unit 19 determines as described above, although the user exists in an area where the locking/unlocking is possible, the measure of security is taken, so that locking/unlocking control becomes impossible. As a result, a situation occurs such that the user cannot enter car 18.

To prepare for such a case, after reception antenna 27 receives response signals, re-extended ringing signal 21B is transmitted again from car interior transmission antennas 20A and 20B as shown in FIG. 6, and car exterior transmission antenna 22A transmits individual authentication ringing signal 31. With such a configuration, the situation as described above can be prevented. Specifically, as shown in FIG. 6, also in a case where reception antenna 27 receives second response signal 25 in addition to a case where reception antenna 27 receives first response signal 26 from the key, control unit 19 controls car exterior transmission antenna 22A to transmit individual authentication ringing signal 31. With such a configuration, only key 24B registered in car 18 as described above responds to individual authentication ringing signal 31. By transmitting re-extended ringing signal 21B in advance, whether key 24B exists in closed space 18A or not can be determined by using the individual authentication response signal 32. As a result, regardless of a presence or absence of key 1024B of another car, an area where key 24B exists can be accurately determined.

If information of whether extended ringing signal 21 of the first time is received or not can be held until key 24B transmits individual authentication response signal 32, it is unnecessary to transmit re-extended ringing signal 21B as the extended ringing signal of the second time.

Third Embodiment

A locking device according to a third embodiment of the present invention will be described below with reference to the drawings. The same reference numerals are designated to components having configurations similar to those of the first or second embodiment and descriptions thereof will not be repeated.

Figure 7:
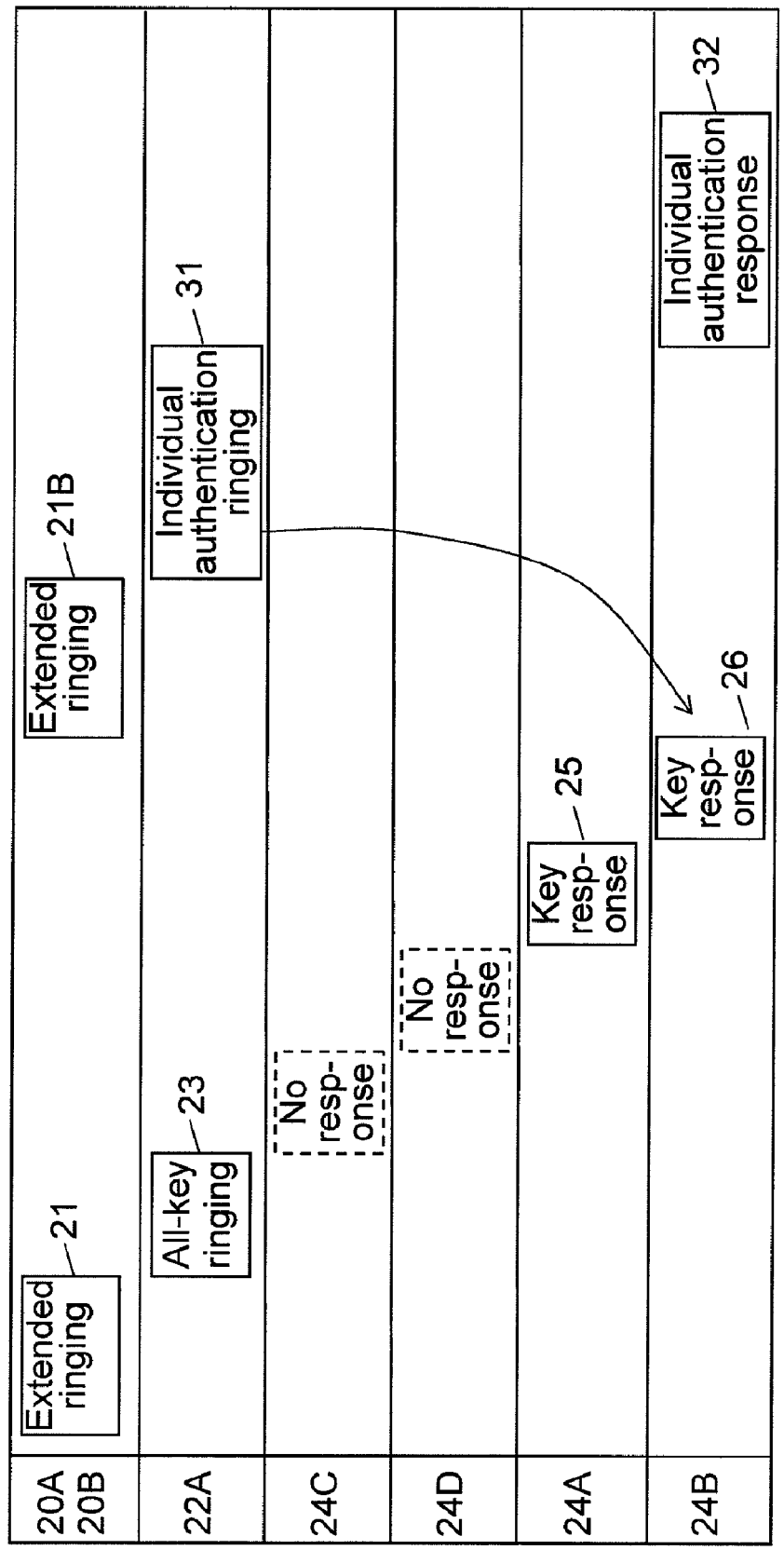
FIG. 7 is a timing chart showing a control procedure of a locking device according to a third embodiment of the present invention.
Figure 8:
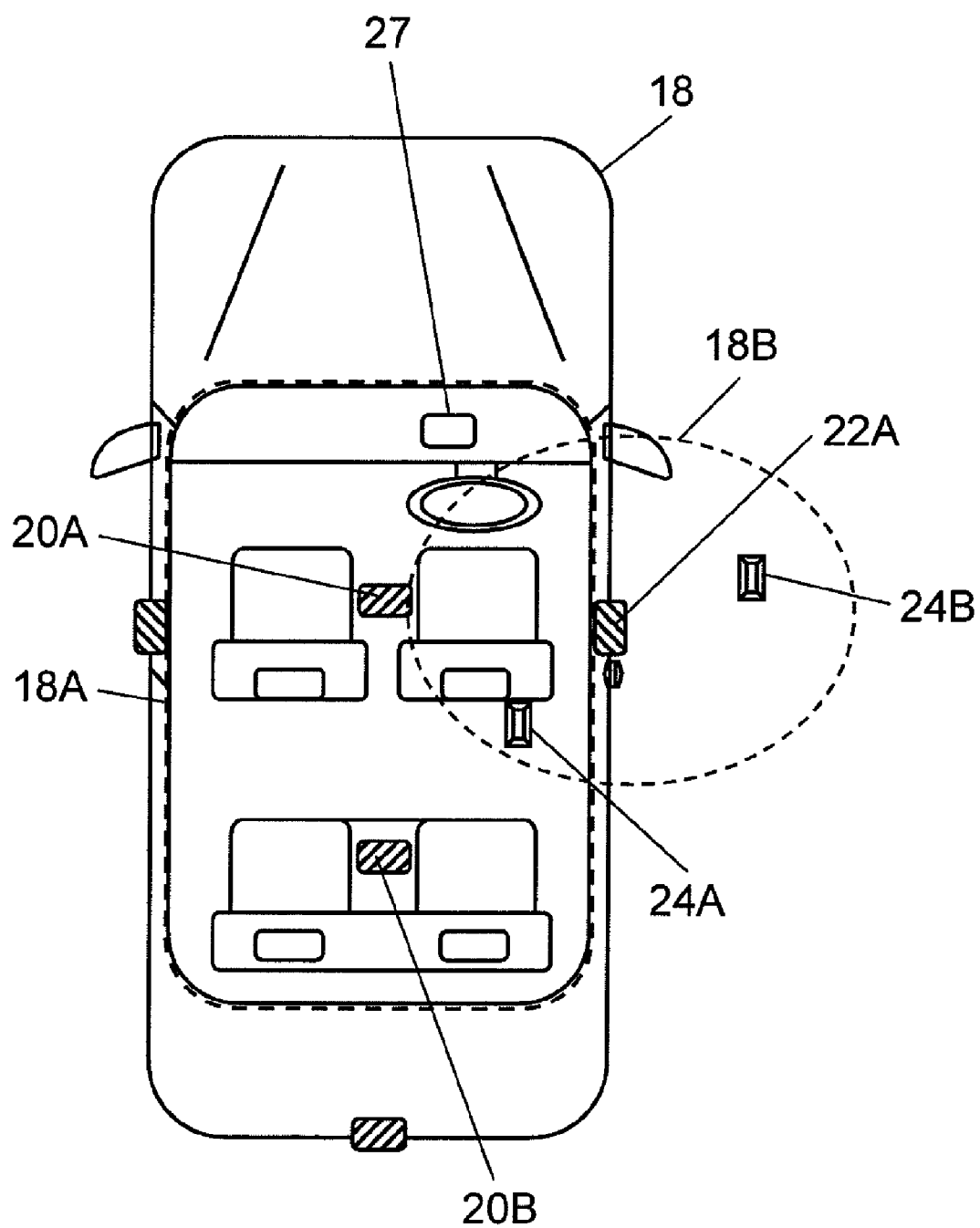
FIG. 8 is a configuration diagram of the locking device according to the third embodiment of the present invention.
Figure 9:
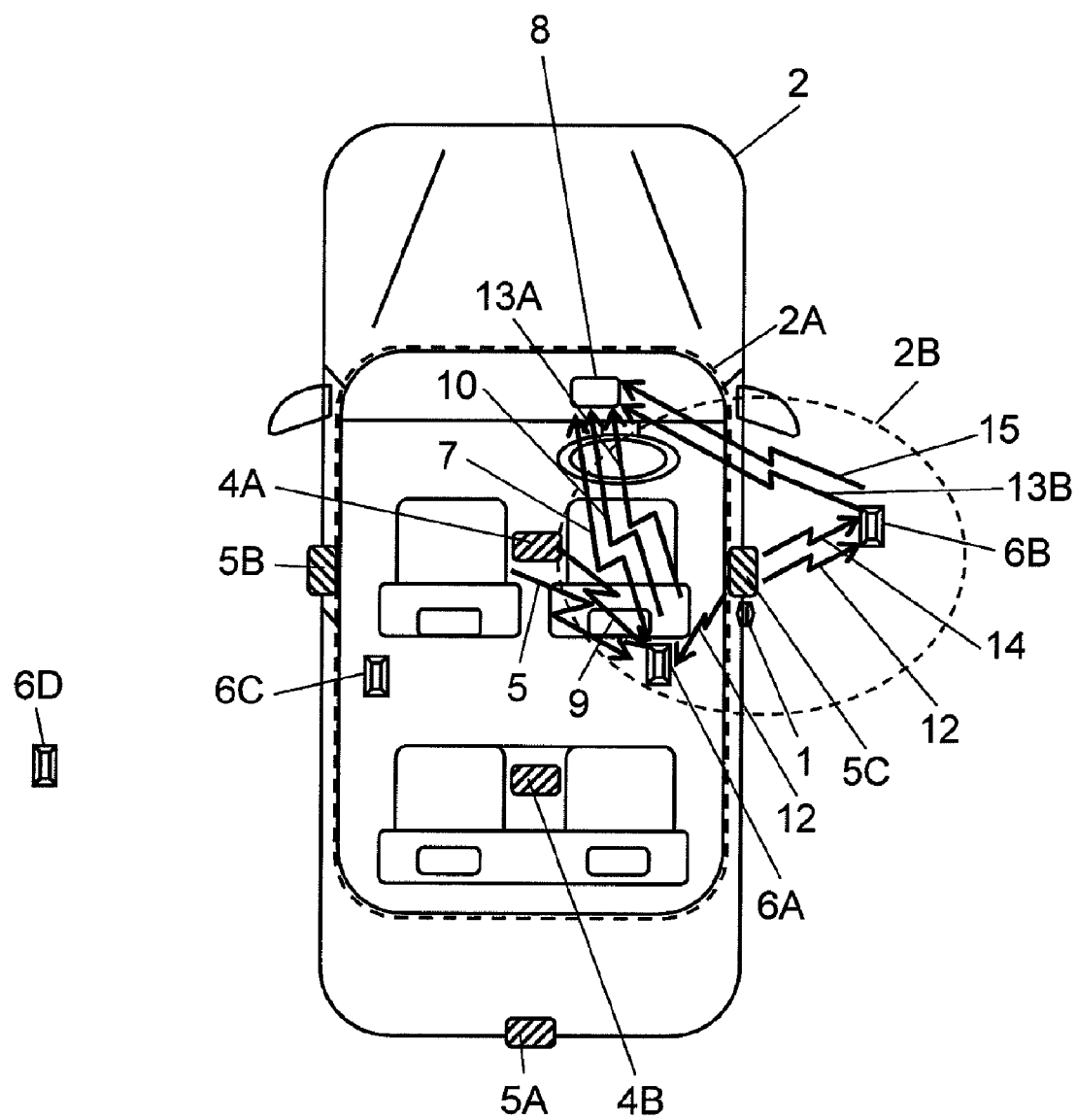
FIG. 9 is a configuration diagram showing an example of a conventional locking device.
Figure 10:
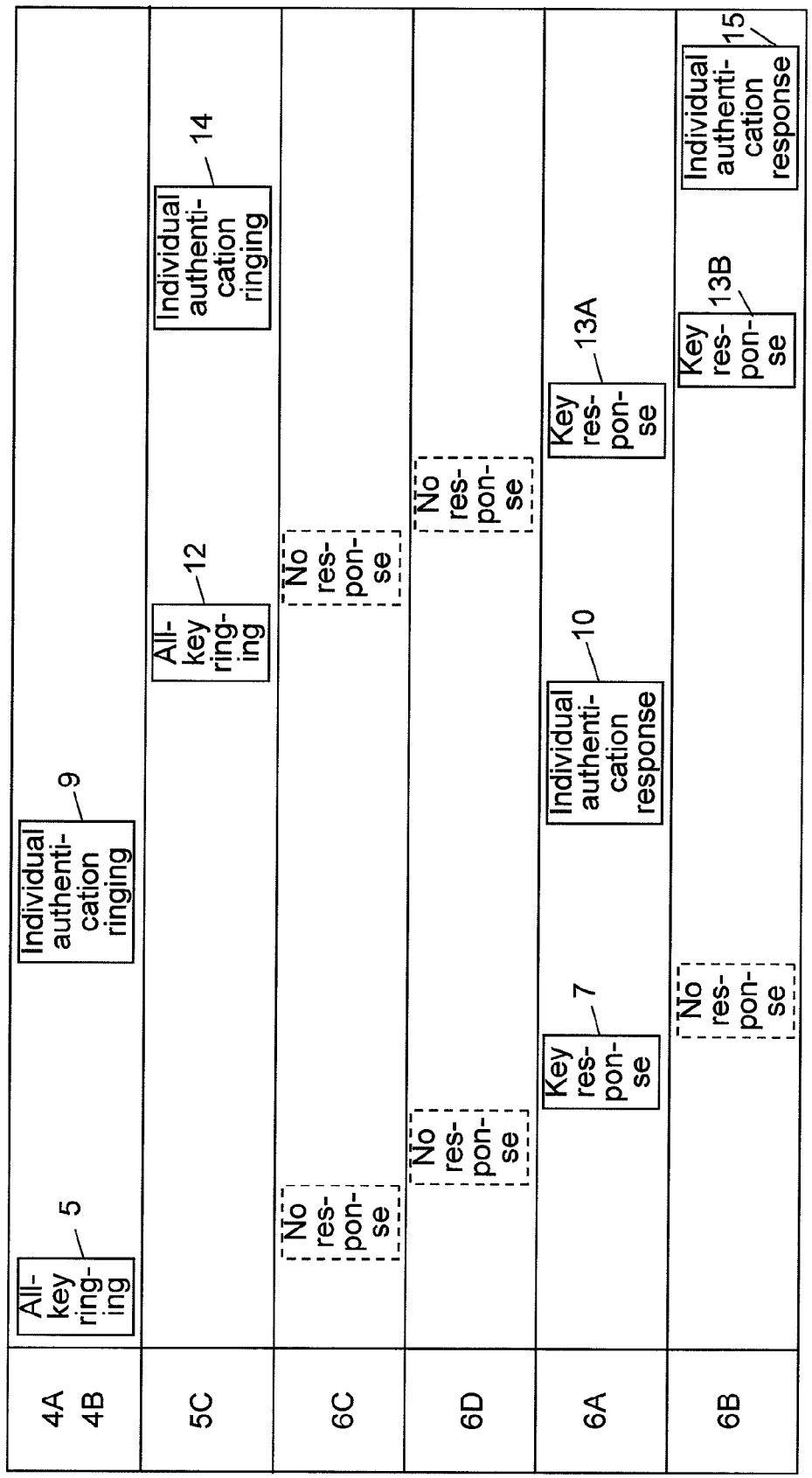
FIG. 10 is a timing chart showing a control procedure of the conventional locking device.

FIG. 7 is a timing chart showing a control procedure of a locking device according to the third embodiment. FIG. 8 is a configuration diagram of the locking device in the present embodiment.

The present embodiment is different from the second embodiment with respect to a point that, as shown in FIG. 7, in a case where control unit 19 receives both first response signal 26 and second response signal 25, individual authentication ringing signal 31 is preferentially transmitted to key 24B which has transmitted first response signal 26. That is, in the present embodiment, in a case where reception antenna 27 receives first response signal 26 and second response signal 25 from a key, control unit 19 transmits individual authentication ringing signal 31 from car exterior transmission antenna 22A to the key which has transmitted first response signal 26 and, then, transmits individual authentication ringing signal 31 from car exterior transmission antenna 22A to the key which has transmitted second response signal 25.

With this configuration, communication time in a case where reception antenna 27 has received both of first response signal 26 and second response signal 25 can be shortened. Hereinafter, the locking device of the present embodiment realizing shortened communication time will be described below.

In the second embodiment, in consideration of a case where reception antenna 27 preferentially has received second response signal 25 from a key registered in another car over first response signal 26 from the key registered in car 18, individual authentication ringing signal 31 is transmitted in both of a case where the response signal is first response signal 26 and a case where the response signal is second response signal 25.

It is now assumed that, in the configuration also considering a key of another car like the second embodiment, as shown in FIG. 8, a key (not shown) registered in another car does not exist in closed space 18A and communication range 18B, only keys 24A and 24B registered in car 18 exist, and first response signal 26 and second response signal 25 are transmitted from the keys. In this case, if the key of another car is considered as in the second embodiment, in FIG. 8, individual authentication ringing signal 31 is transmitted to key 24A before being transmitted to key 24B, so that wasteful communication time is generated. Specifically, once it is confirmed by individual authentication response signal 32 from key 24A that key 24A exists in car 18, individual authentication ringing signal 31 is further transmitted to key 24B, and individual authentication response signal 32 to signal 31 has to be received from the key 24B.

In contrast, in the present embodiment, as shown in FIG. 7, individual authentication ringing signal 31 is transmitted preferentially to key 24B which has transmitted first response signal 26. With such a configuration, time required to transmit individual authentication ringing signal 31 to key 24A which has transmitted second response signal 25 and time required to receive individual authentication response signal 32 from key 24A can be omitted. Therefore, the communication time can be further shortened.

INDUSTRIAL APPLICABILITY

The locking device of the present invention has an effect that communication time can be shortened and is useful for a car and a house.

The invention claimed is:

1. A locking device for locking/unlocking a lock of a door of a closed space, comprising:
   a first transmission antenna for transmitting a first signal to a range including outside of the closed space;
   a second transmission antenna for transmitting a second signal to an inside of the closed space as a target;
   a key which transmits a first response signal when receiving the first signal and not receiving the second signal, and transmits a second response signal when receiving the first signal and also receiving the second signal;
   a reception antenna for receiving at least the first response signal from the key; and
   a control unit for controlling whether locking/unlocking can be performed on the lock or not, based at least on whether the reception antenna receives the first response signal or not
   wherein in a case where the reception antenna receives the first response signal from the key, the control unit controls the first transmission antenna to transmit an individual authentication ringing signal and controls the second transmission antenna to transmit a third signal before the first transmission antenna transmits the individual authentication ringing signal,
   the key transmits a first individual authentication response signal as a response to the individual authentication ringing signal in a case where the third signal is not received, and transmits a second individual authentication response signal as a response to the individual authentication ringing signal in a case where the third signal is received, and
   the control unit controls the lock so that locking/unlocking of the lock becomes possible only in a case where the key transmits the first individual authentication response signal to the reception antenna as a response to the individual authentication ringing signal.

2. The locking device according to claim 1, wherein also in a case where the reception antenna receives the second response signal in addition to a case where the reception antenna receives the first response signal from the key, the control unit controls the first transmission antenna to transmit the individual authentication ringing signal.

3. The locking device according to claim 1, wherein in a case where the reception antenna receives the first response signal and the second response signal from the key,
   the control unit, first, controls the key which has transmitted the first response signal to transmit the individual authentication ringing signal from the first transmission antenna, and
   next, controls the key which has transmitted the second response signal to transmit the individual authentication ringing signal from the first transmission antenna.

4. The locking device according to claim 1, wherein the control unit stores locking/unlocking control information as information related to a control of locking/unlocking performed on the lock and, when the locking/unlocking control information indicates unlocking control in the locking/unlocking control to be performed next, the control unit performs locking control on the lock and, when the locking/unlocking control information indicates locking control, the control unit performs unlocking control on the lock.

5. The locking device according to claim 1, wherein a manual locking/unlocking switch is provided in the closed space, and
   the control unit performs locking control on the lock in a case where a state of the manual locking/unlocking switch is an unlock state, and performs unlocking control on the lock in a case where the state of the manual locking/unlocking switch is a lock state.

* * * * *